US012621533B2

(12) United States Patent
Gellman

(10) Patent No.: US 12,621,533 B2
(45) Date of Patent: *May 5, 2026

(54) PURCHASABLE ITEM ACTIONS ASSOCIATED WITH DIGITAL MEDIA METHODS AND SYSTEMS

(71) Applicant: DISNEY ENTERPRISES, INC., Burbank, CA (US)

(72) Inventor: Thatcher Thornburg Gellman, Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,595

(22) Filed: Feb. 1, 2023

(65) Prior Publication Data

US 2023/0188797 A1      Jun. 15, 2023

Related U.S. Application Data

(63) Continuation of application No. 14/259,063, filed on Apr. 22, 2014, now Pat. No. 11,589,127.

(60) Provisional application No. 61/887,172, filed on Oct. 4, 2013.

(51) Int. Cl.
| | |
|---|---|
| *H04N 21/478* | (2011.01) |
| *H04N 21/254* | (2011.01) |
| *H04N 21/2668* | (2011.01) |
| *H04N 21/414* | (2011.01) |
| *H04N 21/4725* | (2011.01) |

(52) U.S. Cl.
CPC ... *H04N 21/47815* (2013.01); *H04N 21/2542* (2013.01); *H04N 21/2668* (2013.01); *H04N 21/41407* (2013.01); *H04N 21/4725* (2013.01)

(58) Field of Classification Search
CPC ......................... H04N 7/17318; H04N 21/812

USPC ........................................................... 725/60
See application file for complete search history.

(56) References Cited

U.S. PATENT DOCUMENTS

| | | | | |
|---|---|---|---|---|
| 6,496,981 | B1 * | 12/2002 | Wistendahl | .... H04N 21/234318 348/E7.054 |
| 7,079,176 | B1 | 7/2006 | Freeman et al. | |
| 8,132,210 | B2 | 3/2012 | Ackley et al. | |
| 8,281,337 | B2 | 10/2012 | Van Vleck et al. | |
| 8,978,075 | B1 * | 3/2015 | Kaiser | ................ H04N 21/4722 725/62 |
| 9,213,989 | B2 | 12/2015 | Davies | |
| 9,913,002 | B2 * | 3/2018 | An | ...................... H04N 21/4383 |
| 11,589,127 | B2 | 2/2023 | Gellman | |
| 2003/0126611 | A1 | 7/2003 | Chernock et al. | |

(Continued)

OTHER PUBLICATIONS

TVTechnology, AMWA Ratifies MXF Versioning Specification, Nov. 16, 2011, p. 1-6. (Year: 2011).

*Primary Examiner* — Alfonso Castro
(74) *Attorney, Agent, or Firm* — HG LAW LLP

(57) ABSTRACT

Purchasable item actions associated with digital media are disclosed. Digital media associated with a digital media provider is presented at a user device. Trigger data associated with the digital media is presented. In response to a command to activate the trigger data, an actionable indication is displayed of at least one purchasable item associated with the digital media. In response to a selection of the actionable indication of the at least one purchasable item associated with the digital media, an action is performed associated with the at least one purchasable item. The action can include adding the at least one purchasable item to a shopping cart or a wish list.

20 Claims, 11 Drawing Sheets

(56)         References Cited

U.S. PATENT DOCUMENTS

| | | | |
|---|---|---|---|
| 2004/0055018 A1* | 3/2004 | Stone | H04N 21/42204 |
| | | | 348/E5.103 |
| 2004/0104926 A1 | 6/2004 | Murray et al. | |
| 2005/0137958 A1* | 6/2005 | Huber | G06Q 30/02 |
| | | | 705/37 |
| 2007/0250901 A1* | 10/2007 | McIntire | G11B 27/34 |
| | | | 348/E7.071 |
| 2007/0266170 A1 | 11/2007 | Mockett | |
| 2009/0112680 A1 | 4/2009 | Dovrath et al. | |
| 2009/0304365 A1* | 12/2009 | Prestenback | G06Q 30/02 |
| | | | 386/250 |
| 2011/0162007 A1 | 6/2011 | Karaoguz et al. | |
| 2011/0307920 A1 | 12/2011 | Blanchard et al. | |
| 2011/0321096 A1* | 12/2011 | Landow | H04N 21/8126 |
| | | | 725/41 |
| 2012/0147022 A1* | 6/2012 | Roberts | H04N 21/4126 |
| | | | 345/158 |
| 2012/0216226 A1 | 8/2012 | Humphrey et al. | |
| 2012/0266197 A1* | 10/2012 | Andrews, II | H04N 21/4725 |
| | | | 725/60 |
| 2013/0014155 A1 | 1/2013 | Clarke et al. | |
| 2013/0212477 A1 | 8/2013 | Averbuch | |
| 2013/0254824 A1 | 9/2013 | Eyer | |
| 2013/0339999 A1* | 12/2013 | SanGiovanni | H04N 21/43615 |
| | | | 725/35 |
| 2014/0280919 A1 | 9/2014 | Lakes et al. | |

* cited by examiner

200

IDENTIFY AN OBJECT — 202

IDENTIFY ITEMS ASSOCIATED WITH THE OBJECT — 204

ASSOCIATE ITEMS WITH THE OBJECT TO GENERATE A PACKAGE — 206

300

RECEIVE A PACKAGE AND A DIGITAL MEDIA — 302

GENERATE TRIGGER DATA — 304

DISPLAY TRIGGER DATA WITH THE DIGITAL MEDIA — 306

TRIGGER ACTION? — 308

NO

YES

DISPLAY UI — 310

PURCHASABLE ITEM ACTIONS ASSOCIATED WITH DIGITAL MEDIA METHODS AND SYSTEMS

CROSS-REFERENCE TO RELATED APPLICATIONS

This application is a continuation of co-pending U.S. patent application Ser. No. 14/259,063 entitled "Interactive Multimedia Package Methods and Systems" filed on Apr. 22, 2014 which claims the benefit of U.S. Provisional Application No. 61/887,172, entitled "Methods And Systems Of Delivering A Multimedia Package," filed on Oct. 4, 2013 and which are hereby incorporated herein by reference in their entireties.

TECHNICAL FIELD

The present application relates generally to digital media, more particularly, some embodiments relate to interactive multimedia package methods and systems.

DESCRIPTION OF THE RELATED ART

Digital distribution is the delivery of media content (e.g., audio, video, software, or video games) without the use of physical media. Digital distribution has become ubiquitous and bypassed conventional physical distribution methods (e.g., paper, CDs, or DVDs) due to the advances in computer networking and communication technologies. Nevertheless, interaction with digitally distributed media is often limited. For example, users cannot select objects of interest to them directly from the digital media. Or, a user must navigate away from the digital media to look up an object in the digital media.

BRIEF SUMMARY OF THE APPLICATION

Interactive multimedia package methods and systems are provided. Various embodiments generate, manage, deliver, and/or play interactive multimedia packages with various digital media. An interactive multimedia package may be incorporated into any platform such as physical media (e.g., CDs, DVDs, etc.), web services (e.g., download, or streaming), and other applications. A user may shop directly off of the digital media that he or she is experiencing (e.g., watching a movie, viewing a digital news, reading an e-book, playing a video game, etc.) The user may be directed to an e-commerce website, a digital storefront, or a list of items associated with an object, by clicking on the object of interest in the digital media. A user may choose to add an item to his or her shopping cart or wish list or purchase an item immediately.

A user's interaction with the interactive multimedia package may be recorded, tracked, and/or analyzed. Digital media may be recommended or presented to the user based on the user's interactions such as a browsing and/or purchase history. Items may be arranged and presented to the user in an order determined based on the user's interactions. Systems and methods described herein may act as a centralized customer interface that can interact with various item providers (e.g., E-commerce storefronts) to ensure that the customer finds all items and services that are related to their digital media experiences.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Before describing the application in detail, it is useful to describe an example environment in which the application can be implemented. One such example is illustrated in FIG. 1.

Figure 1:
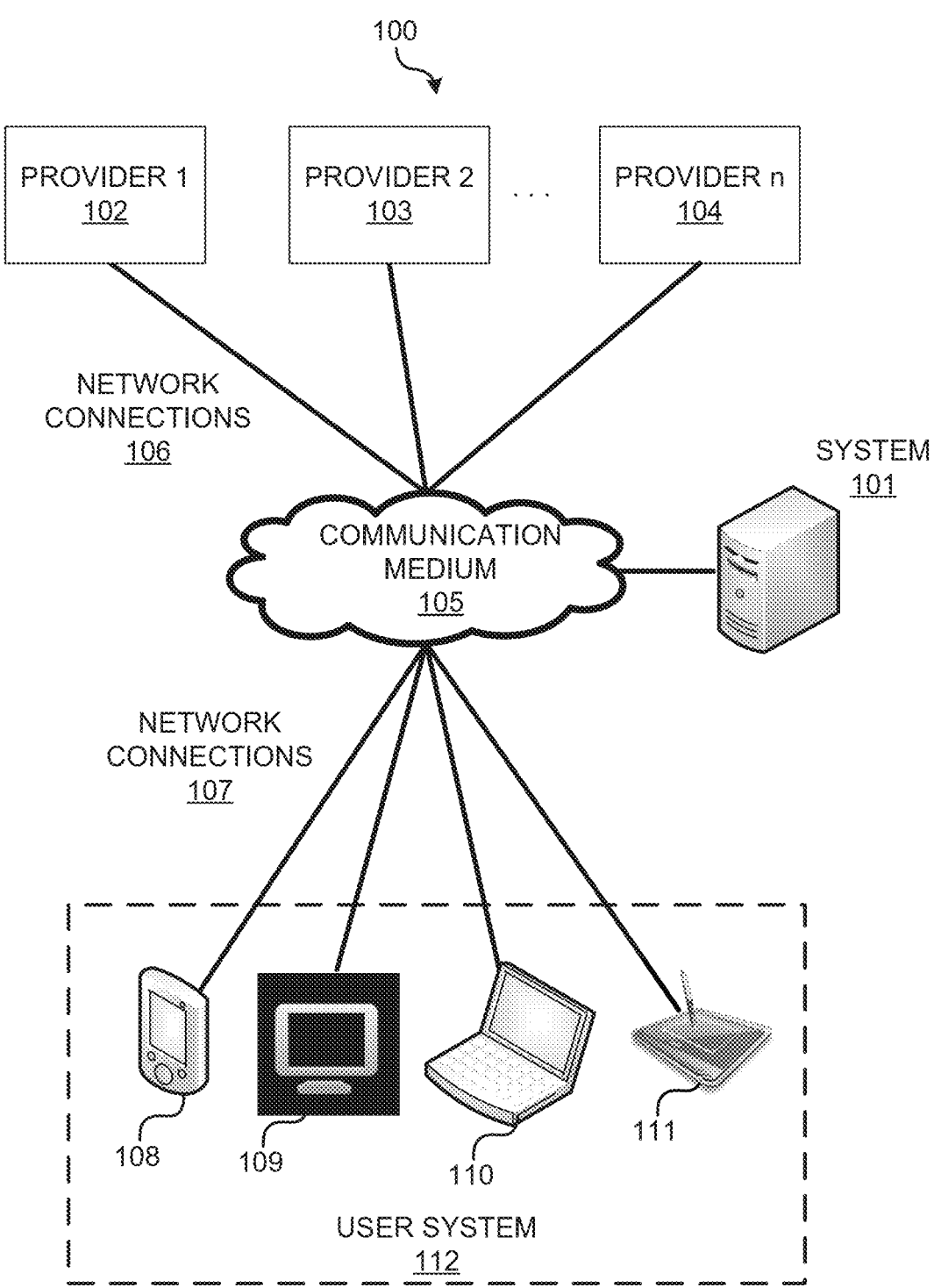
FIG. 1 illustrates an exemplary environment where various embodiments may be implemented.

FIG. 1 illustrates an exemplary environment 100 where various embodiments may be implemented. The environment 100 comprises various user devices 108-111, which may be collectively referred to as a user system 112 connected via a communication medium 105. An interactive multimedia package may be associated with a digital media to facilitate a user identifying and purchasing items that are related to an object of interest in the digital media. A digital media may comprise various digital assets such as a video content, an audio content, or a subtitle. Various embodiment may create, deliver, manage, and/or play an interactive multimedia package. In some embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

As shown, a user system 112 may include a smartphone 108 (e.g., iPhone®), a TV 109, a computer 110 (e.g., a personal computer), and/or a tablet 111 (e.g., iPad®), which through their respective network connections 107, can either interact directly or indirectly with the various digital media providers 1-*n* 102-104, via their respective network connections 106. For example, a network connection 106 or 107 may include wired connections (e.g., Digital Subscriber Line (DSL), optical) and/or wireless connections (e.g., Wi-Fi.) In various embodiments, a network connection 106 or 107 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof. A network connection 106 or 107 needs not necessarily be the same throughout the environment 100. Various user devices 108-111 described herein may be implemented using the example computer system illustrated in FIG. 9.

In one embodiment, an interactive multimedia platform may be hosted by an interactive multimedia system 101 which is coupled to the communication medium 105. An interactive multimedia package may be created, delivered, managed, and/or played by using the interactive multimedia platform. An interactive multimedia package may be provided to various digital media providers 102-104. The interactive multimedia system 101 may provide consolidated site direction. The interactive multimedia system 101 may provide a central service point, which allows digital media providers 102-104 to manage how a user should be directed. For example, digital media providers 102-104 may update the links to items that are associated with an object in the digital media.

The interactive multimedia system 101 may manage the interactive digital media being played among various devices 108-111 of the user system 112. For example, the interactive multimedia system 101 may create interactive multimedia packages compatible with digital media from various media content providers, and/or provide a user with access to item providers hosting items associated with one or more objects in digital media. The interactive multimedia system 101 may allow a digital media being displayed simultaneously among multiple devices 108-111 of the users system 112, a user may interact with the digital media on one device while the digital media is continuously being displayed on the rest of the devices. In addition, the interactive digital media system 101 may allow a user to enable or disable such feature while playing the digital media. The interactive digital media system 101 may record and/or track items viewed or purchased by a user. The interactive digital media system 101 may analyze a user's preferences based on the record, and provide digital media or items to the user based on the user's preferences.

In various embodiments, the user system 112 can display any interface related to playing and interacting with a digital media. For example, the user system 112 may be configured to retrieve a digital media, to receive a digital media request from a user, to identify an object that are associated with items for purchase, to present a user interface (UI) to a user, to receive a user's request to view items associated with an object, and/or to display purchase options to the user. In one embodiment, a user may download a client component of an interactive multimedia system 101 such as an interactive multimedia application. The client component may be executed locally at a user system 112. In some embodiments, the interactive multimedia system 101 may provide back-end support for the client component. The interactive multimedia system 101 may be responsible for providing a multimedia package that is compatible with various digital media from different providers 102-104, delivering a multimedia package compatible with various digital media from different providers 102-104, directing a user's selection of an item for purchase to a web address, tracking and analyzing a user's preferences, providing additional digital media based on the user's preferences, and/or providing items for purchase in an order determined based on the user's purchase history.

Figure 2:
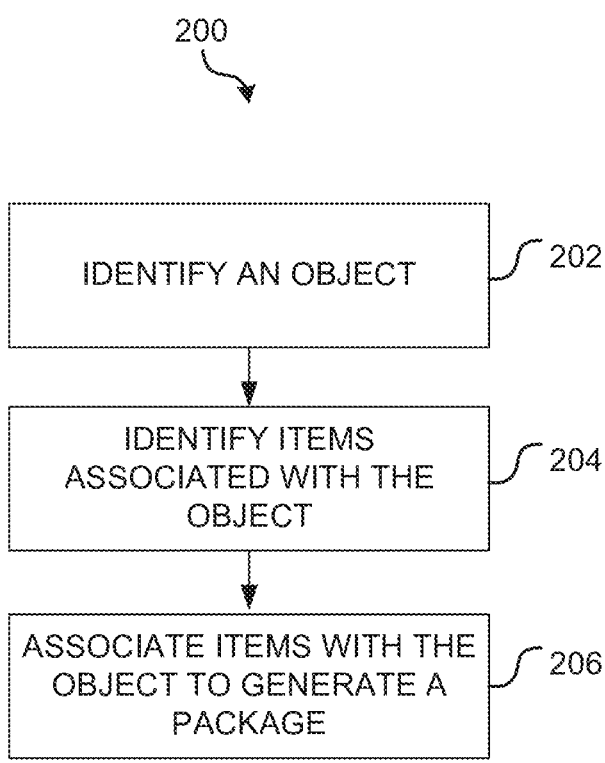
FIG. 2 is a flow diagram illustrating an exemplary method of creating an interactive multimedia package, such as for the interactive multimedia package system illustrated in FIG. 1.

FIG. 2 is a flow diagram illustrating an exemplary method of creating an interactive multimedia package, such as for the interactive multimedia package system illustrated in FIG. 1. At step 202, an object in a digital media is identified. In various embodiments, metadata in the digital media associated with the object is identified. For example, the name, the description, the time stamp, the hotspot region or location of the object, and/or the duration of the object appearance may be identified. At step 204, a set of items related to the object is identified. Each item corresponds to an item provider from which a user may purchase the item. In some embodiments, the web address (e.g., a uniform resource locator ("URL")) may be identified for each item. A short URL may be registered with the item and links to the web page hosting the item that has a long URL. The web address may be a long URL where the item may be located.

At step 2016, an interactive multimedia package is generated. The package provides information associating an object in the digital media with the items identified at step 204. In some embodiments, the interactive multimedia package may comprise metadata of the object such as the name, the description, the time stamp, the hotspot region or location of the object, and/or the duration of the object appearance. In some embodiments, the interactive multimedia package may comprise a link to the item provider (e.g., a digital storefront, an E-commerce site) where the item may be purchased, a link to the web address where the item may be purchased, or a link that directs a user's selection of an item to an intermediate server that directs the user to the item provider. A user may activate the link by clicking on an item. In some embodiments, the interactive multimedia package may comprise a Multi-language Framework ("MLF") asset related to the digital media. For example, if the digital media is a video, the MLF asset may include features, trailers, artwork, audio, or subtitles. The MLF asset may be different for different digital media providers such as a video service provider (e.g., Netflix®, Vudu®, Apple iTunes®, Amazon®, etc.) The interactive multimedia package may provide information regarding the digital media provider that the digital media is available.

In some embodiments, the interactive multimedia package may comprise a link to various digital assets or features of a digital media. For example, an interactive multimedia package may include a link to the video content (e.g., a movie file), to the audio content (e.g., the audio file), or to the subtitle. In some embodiments, the interactive multimedia package may comprise one or more digital assets that are included in the digital media. For example, a video content or an audio content including various features (e.g., bonus features, alternative endings, etc.), localized audio, metadata, subtitles, and/or narratives may be included in the package. In some embodiments, the interactive multimedia package may comprise feature metadata of the digital media such as information about the digital media (e.g., synopsis, cast, production year, genre type), information about the digital asset (e.g., the resolution, the sound quality, the language), or promotion materials (e.g., posters, trailers, etc.) In some embodiments, the interactive multimedia package may comprise encryption for some digital media. The encryption may be used to track a user who opens and activates the package when playing the digital media.

The interactive multimedia package may comprise trigger data configured to direct a user to the web address hosting the item in response to a user's command. In some embodiments, trigger data may be configured to be presented to the user in response to a triggering event (e.g., time point, frame count, etc.) For example, upon detecting a frame or a time point, trigger data configured to direct a user to a web address may be displayed to the user with the digital media. Trigger data may be further configured to direct a user to a UI in response to a user's trigger action. A user may activate trigger data by motions (e.g., click, tap, double click, swipe, blink, etc.) or voice (e.g., speaking to a microphone) controls. A list of items related to an object, a digital store front, an e-commerce site, a detailed description of an item, a 3-D view, may be displayed to the user in the UI.

In some embodiments, the interactive multimedia package may be a manifest file (e.g., an extensible markup language ("XML") file). The package may register a set of short URLs with an object. Each short URL is associated with a long URL that directs to a webpage hosting the item. A user may be directed to the web address where an item associated with the object is located by clicking on the object in the digital media. When the web address from which an item associated with the object changes, the long URL may be updated without changing the short URL.

In various embodiments, the interactive multimedia package may be wrapped in an executable and automated delivery system. In various embodiments, an interactive multimedia package, created at step 206, may be provided to various digital media providers (e.g., Netflix®, Vudu®, Apple iTunes®, Amazon®, etc.) An interactive multimedia package may be compatible with multiple digital media providers. In some embodiments, an interactive multimedia package may be compatible with only one digital media providers. Each provider, upon receiving an interactive multimedia package, may be required to activate the interactive multimedia package.

Figure 3:
FIG. 3 is a flow diagram illustrating an exemplary method of executing an interactive multimedia package, such as for the interactive multimedia package system illustrated in FIG. 1.
Figure 3:
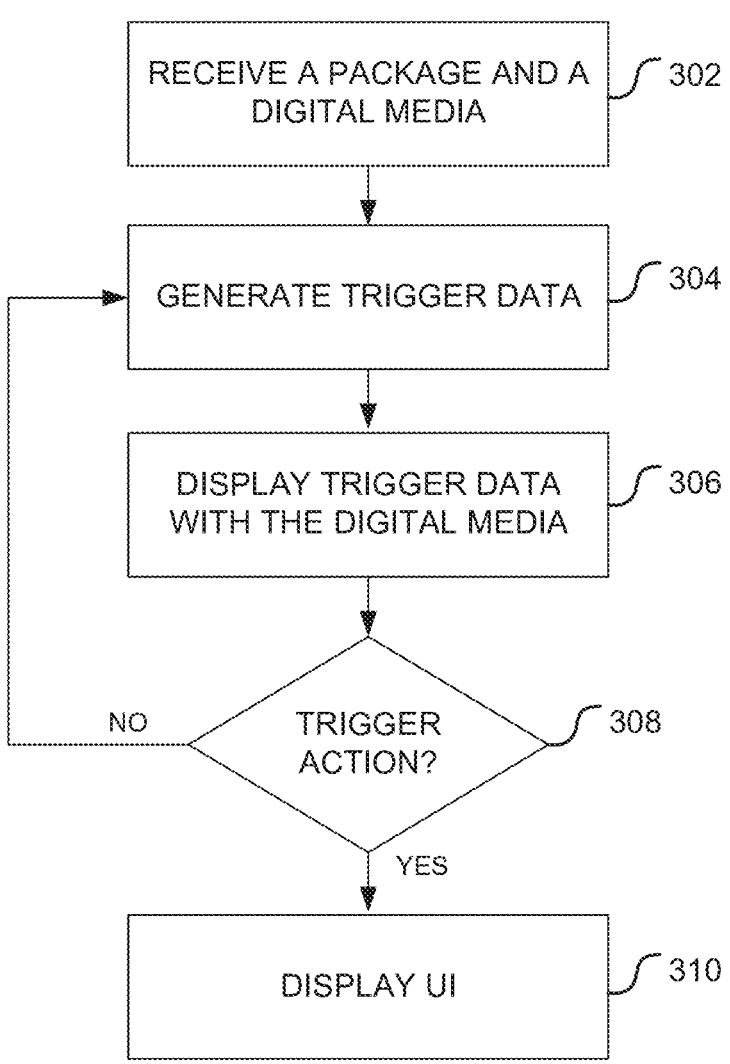

FIG. 3 is a flow diagram illustrating an exemplary method of executing an interactive multimedia package, such as for the interactive multimedia package system illustrated in FIG. 1. At step 302, an interactive multimedia package is received along with a digital media. The interactive multimedia package provides information regarding various items for purchase that are related to one or more objects in the digital media. At step 304, the interactive multimedia package is processed to generate trigger data. Trigger data may be automatically executed in response to certain events (e.g., time, frame count) and be configured to direct a user to a web address hosting the item. For example, upon detecting a frame is being displayed at a time point, trigger data may be displayed with the digital media. In various embodiments, trigger data may be generated, associated with the object, and displayed to the user. Via the trigger data, a user may be directed to a web address hosting the item or a digital store where the item is available.

At step 306, the trigger data generated at step 304 is displayed along with the digital media. Trigger data configured to direct a user to an item for purchase may be displayed to the user. Trigger data may be presented on the device which plays the digital media, or on another device different from the device that plays the digital media. Trigger data may be configured to direct a user to a user interface for purchasing various items related to an object in response to a user's trigger action. For example, a user may click on an object, tap on an object, or speak to a device, to activate trigger data. At step 308, a user's trigger action is detected. The trigger action may activate a link included in an interactive multimedia package. Upon detecting a trigger action, a user interface ("UI") may be provided to the user. The UI may present various information such as one or more items for purchase that are related to an object, a shopping cart, a wish list, a digital store front, an e-commence website, etc. The user may be provided with a user interface ("UI"), via which the user may interact with digital media as well as various e-commerce sites where items associated with the object may be purchased. The UI may be displayed in the same screen where the digital media is being displayed, or in a different screen separate from the screen where the digital media is being displayed.

The UI may be configured to direct a user to a web address hosting the item, to direct a user to a digital store front, to view an item, to save an item to a user's cart, or to edit the user's cart, etc. At a digital storefront, a user may browse a list of items associated with the object of interest to the user. The listing of the items associated with the object allows a user to interact with the items, such as, adding an item of interest to a purchase list, adding an item to a wish list, or checking the detailed description of an item, etc. When a user adds an item to his or her shopping cart, he or she may choose the next step such as proceeding onto the full e-commerce site, proceeding to check out, or interacting with the UI to be directed to another UI such as to be directed to another item for purchase.

Figure 4:
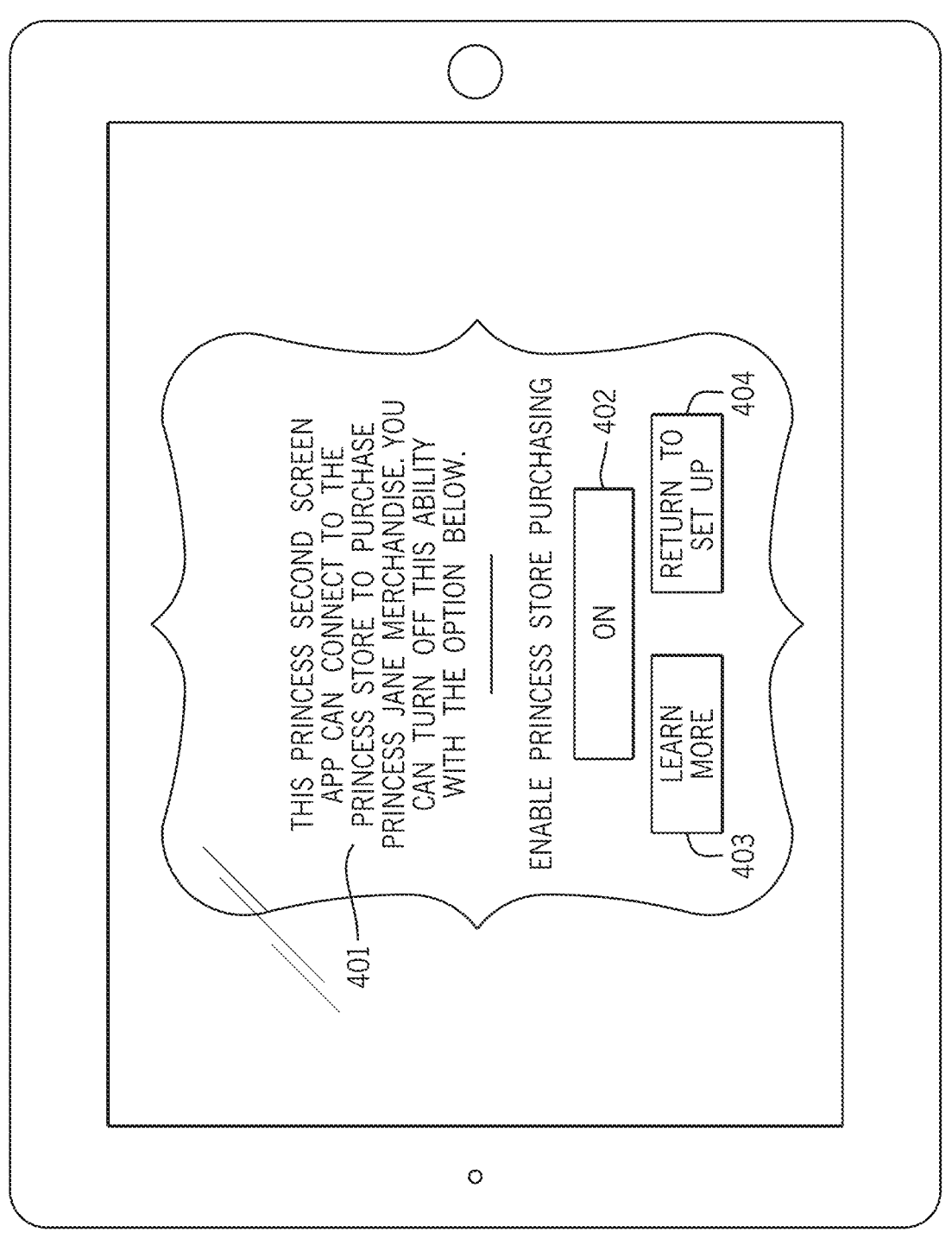
FIG. 4 illustrates an exemplary UI of an exemplary interactive multimedia system in accordance with an embodiment of the present application.

FIGS. 4-9B illustrate an exemplary interactive multimedia system that integrates a Fairytale store with the Princess movie. One of ordinary skill in the art would appreciate that any item provider may be integrated with a digital media similar to the embodiments illustrated in FIGS. 4-9B. FIG. 4 illustrates an exemplary UI of an exemplary interactive multimedia system in accordance with an embodiment. Upon delivery and execution by a user device, various embodiments may allow a user to choose to enable or disable this feature. As such, a user may opt in or out from the ability to connect to the Fairytale store provided by this interactive multimedia package. As illustrated, the interactive multimedia package is enabled. UI 401 shows that an interactive multimedia package may be enabled or disabled. When enabled, a user may be directed to one or more stores from which a user may purchase one or more items. In the illustrated example, the interactive multimedia package is enabled, as indicated in the UI 402. In some embodiments, an interactive multimedia package may be set to be enabled only in a time duration specified by a user. In addition, a user may learn more about how this feature functions using this page by clicking on the "learn more" icon 403 or return to the set up page by clicking on the "return to set up" icon 404.

Figure 5:
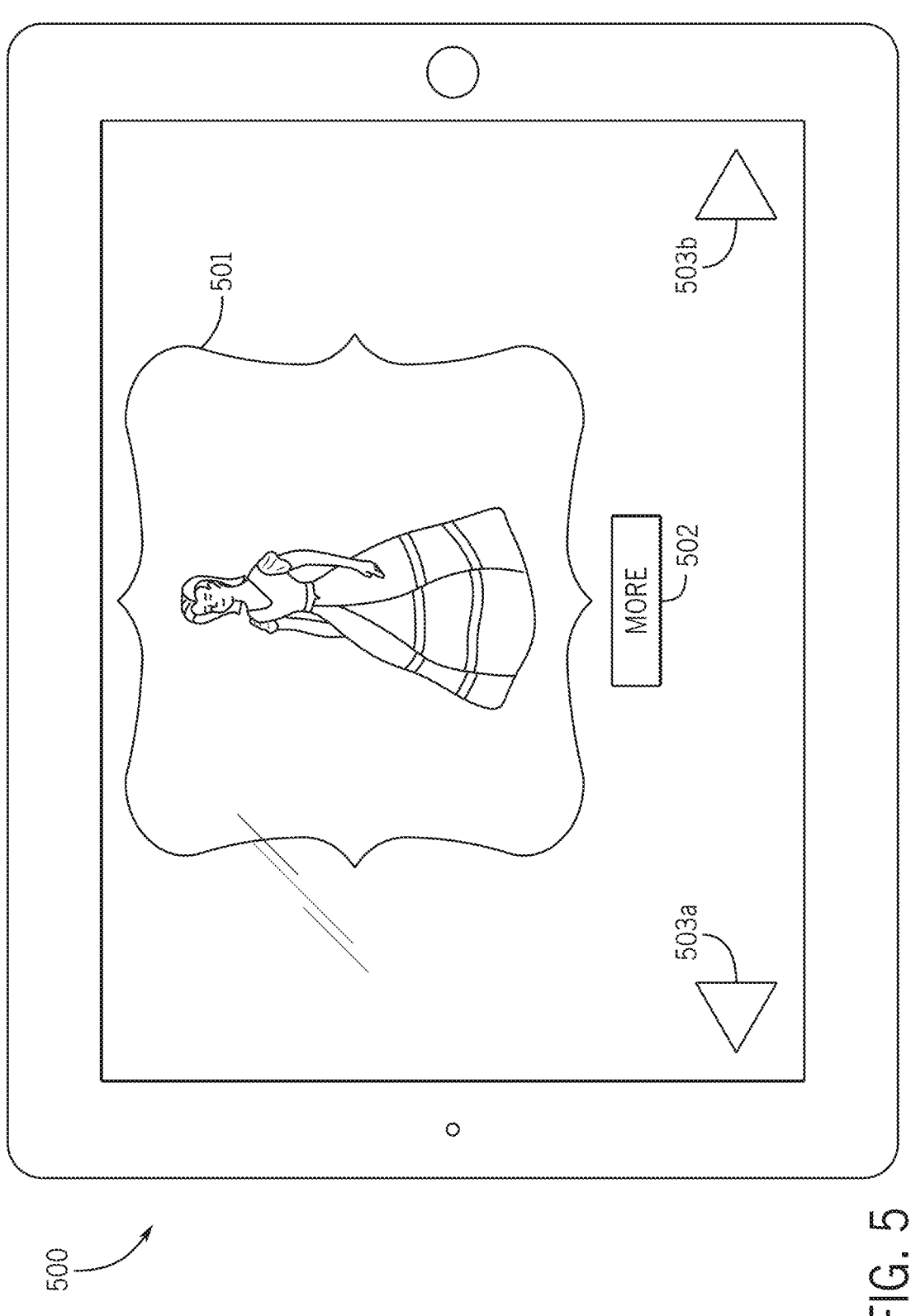
FIG. 5 illustrates an exemplary UI of an exemplary interactive multimedia system in accordance with an embodiment.

FIG. 5 illustrates an exemplary UI of an exemplary interactive multimedia system in accordance with an embodiment. In various embodiments, an interactive multimedia package may provide information regarding one or more items related to an object of a digital media. Trigger data may be generated by processing the interactive multimedia package. Upon detecting a triggering event (e.g., a time point, a frame count, etc.), trigger data may be displayed to the user. In response to a user's trigger action, a UI such as the UI 500 may be displayed to a user. The UI 500 displays a Princess doll in response to a user's trigger action. Via the UI 500, the user may select the Princess doll using the UI 501, view more purchasing options using the button 502, or browse more items using the buttons 503a-b. In various embodiments, the UI may be configured such that a user may interact with the UI without interrupting playing the digital media. A UI may be displayed in a secondary screen separate from the primary screen where the digital media is being played. In other embodiments, the UI may be displayed in the primary screen.

In various embodiments, a UI may be configured based on the object corresponding to the user's trigger action. The object may be used to determine the configuration of the UI. For example, one or more items may be determined from the interactive multimedia packaging. The interactive multimedia package may host a database of items. In response to a user's trigger action, a set of items related to the object may be determined and displayed to the user. Various items may be determined according to a user's selection and/or preferences. For example, the user's region, the user's personal profile (e.g., age, career, etc.), or the user's preference setting may be used to determine the items to be displayed to the user in response to the user's trigger action. The database of items may also recognize an item provider for each item. The list of items may be displayed to the user subsequent to an event (e.g., an interaction point in a game, completion of a scene, etc.) to avoid interruption to the digital media experience.

Figure 6:
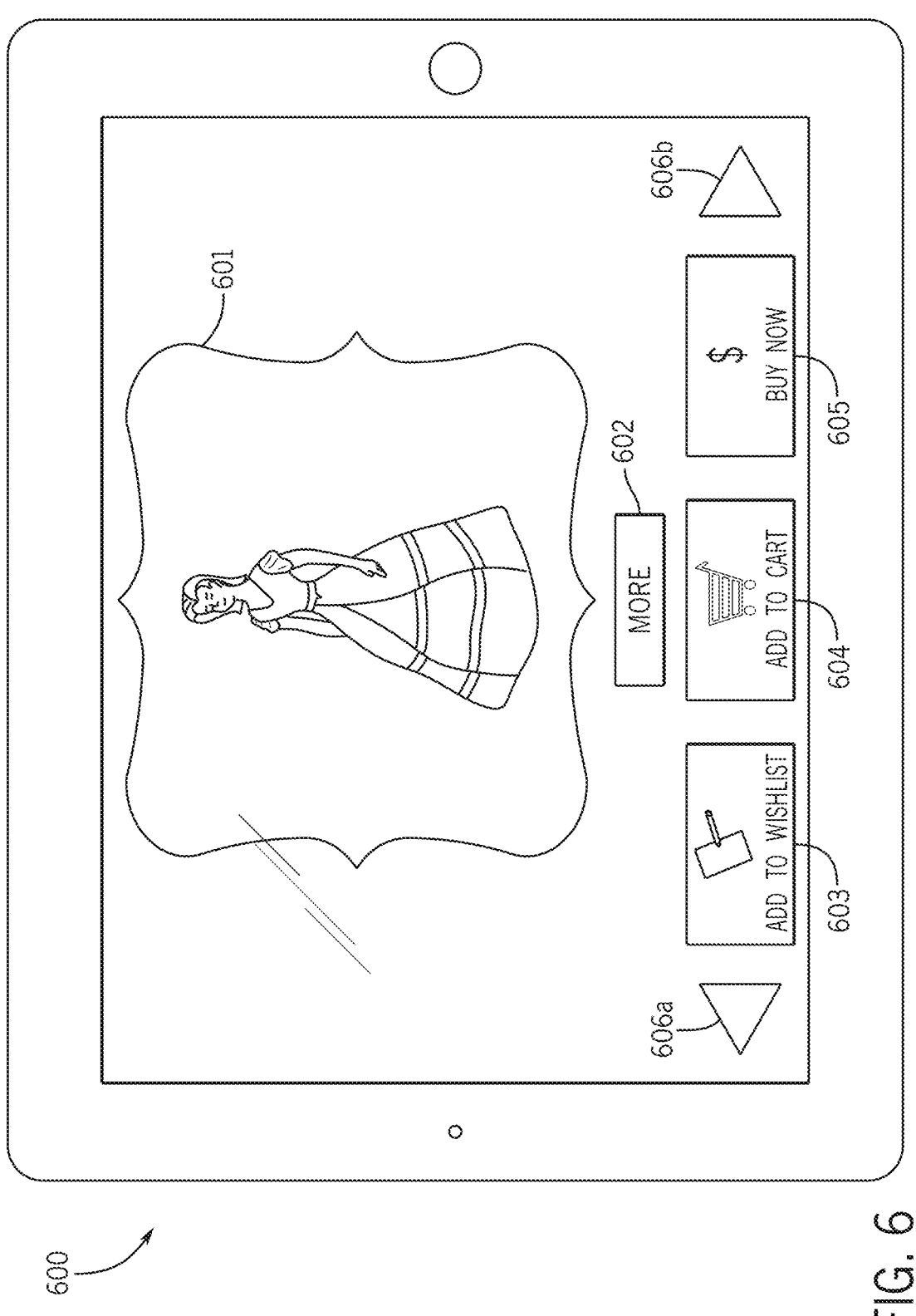
FIG. 6 illustrates an exemplary UI of an exemplary interactive multimedia system in accordance with an embodiment.

FIG. 6 illustrates an exemplary UI of an exemplary interactive multimedia system in accordance with an embodiment. Various embodiments provide a wish list that allows a user to add an item or an object to the wish list without being redirected away from the digital media right away. As such, the user may make the purchase determination at a later time. The option to purchase an item or complete a transaction may be offered to the user. If the user desires to purchase an item immediately, he or she may tap on the item to navigate to a web view and complete the transaction. The UI 601 indicates a Princess doll is available for purchase. A user may open additional views of the Princess doll using the button 602, add this item to his or her wish list by clicking on the button 603, add this item to the cart by clicking on the button 604, or to purchase the item and proceed to check out by clicking on the button 605. In further embodiments, a user may add an object of interest to a wish list. The user may be notified at a later time when new items associated with the object are found.

Figure 7:
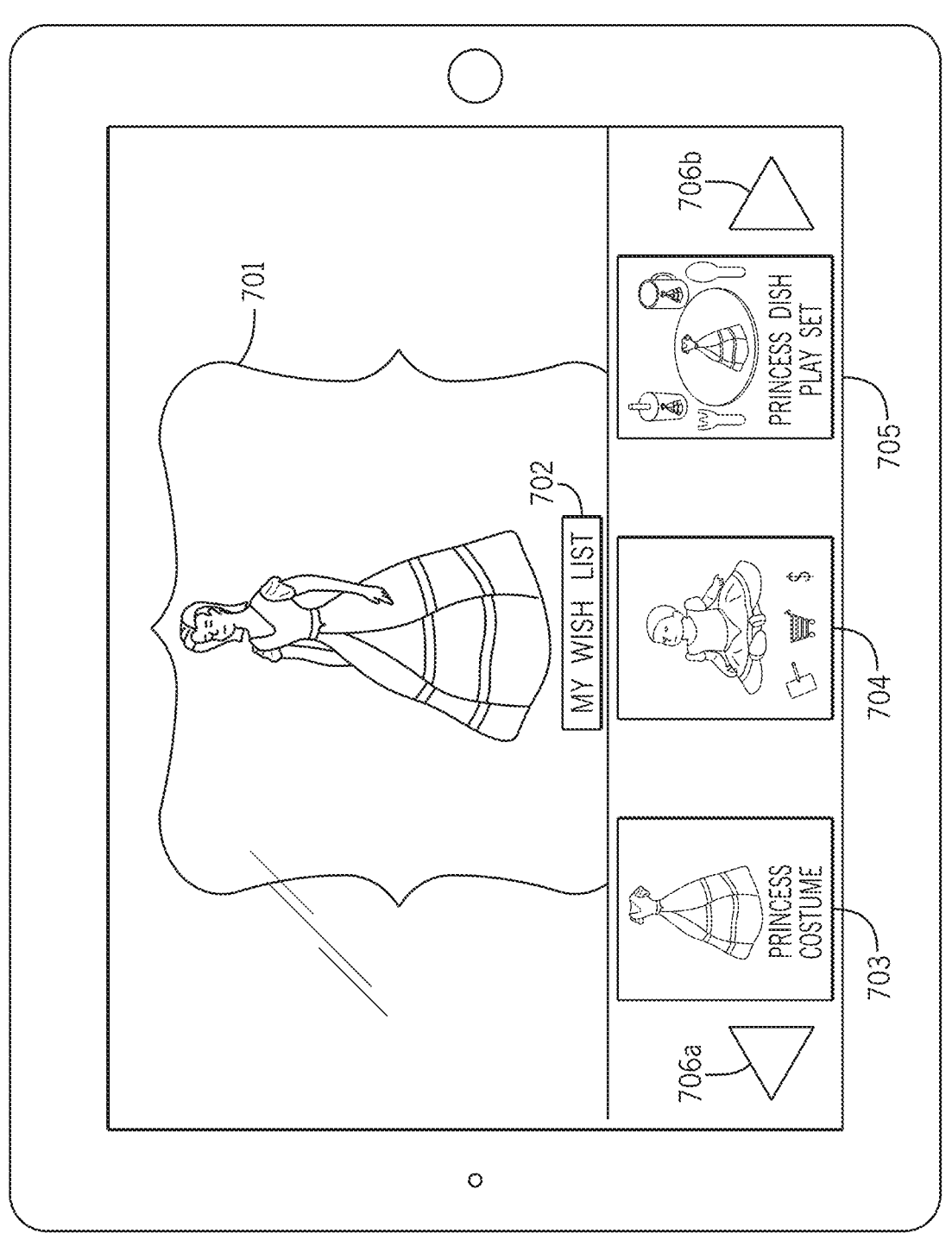
FIG. 7 illustrates an exemplary UI of an exemplary interactive multimedia system in accordance with an embodiment.

FIG. 7 illustrates an exemplary UI of an exemplary interactive multimedia system in accordance with an embodiment. In various embodiments, a user may add an item to his or her wish list such that the user may make the purchase determination at a later time. A user may delete an item from the wish list or select an existing item in the wish list to check out. In the illustrated example, a user may review items in his or her wish list by clicking on the button 702. The side scrolling menus 706a-b allow a user to review other items, if any, in the wish list by using a swiping motion. In one embodiment, existing items in the wish list that are related to an object may be displayed simultaneously with the display of the digital media. Upon detecting an object is present when playing the digital media, the items in the user's wish list that are associated with the object may be displayed to the user for review.

Figure 8A:
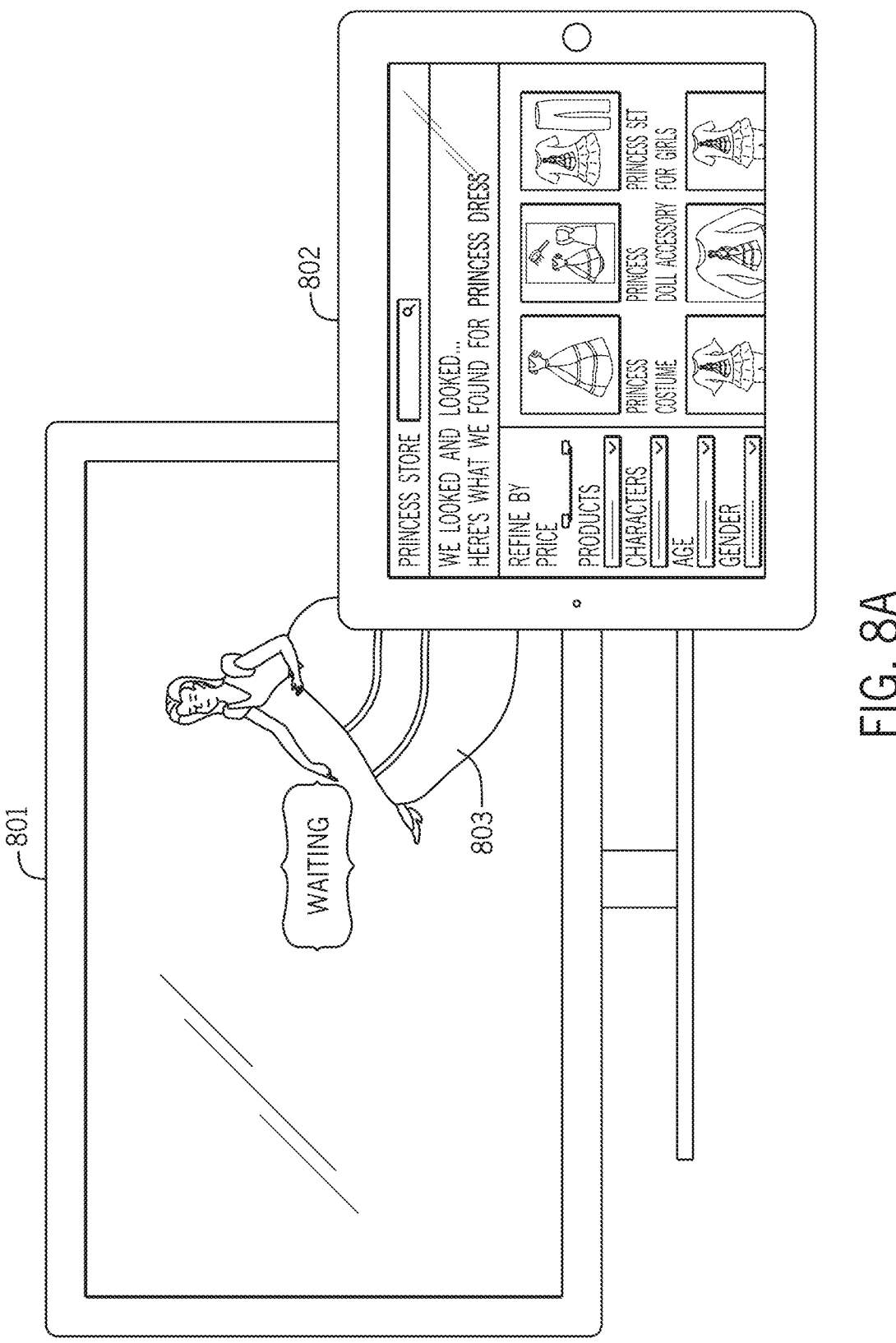
FIG. 8A illustrates an exemplary UI of an exemplary interactive multimedia system in accordance with an embodiment.
Figure 8B:
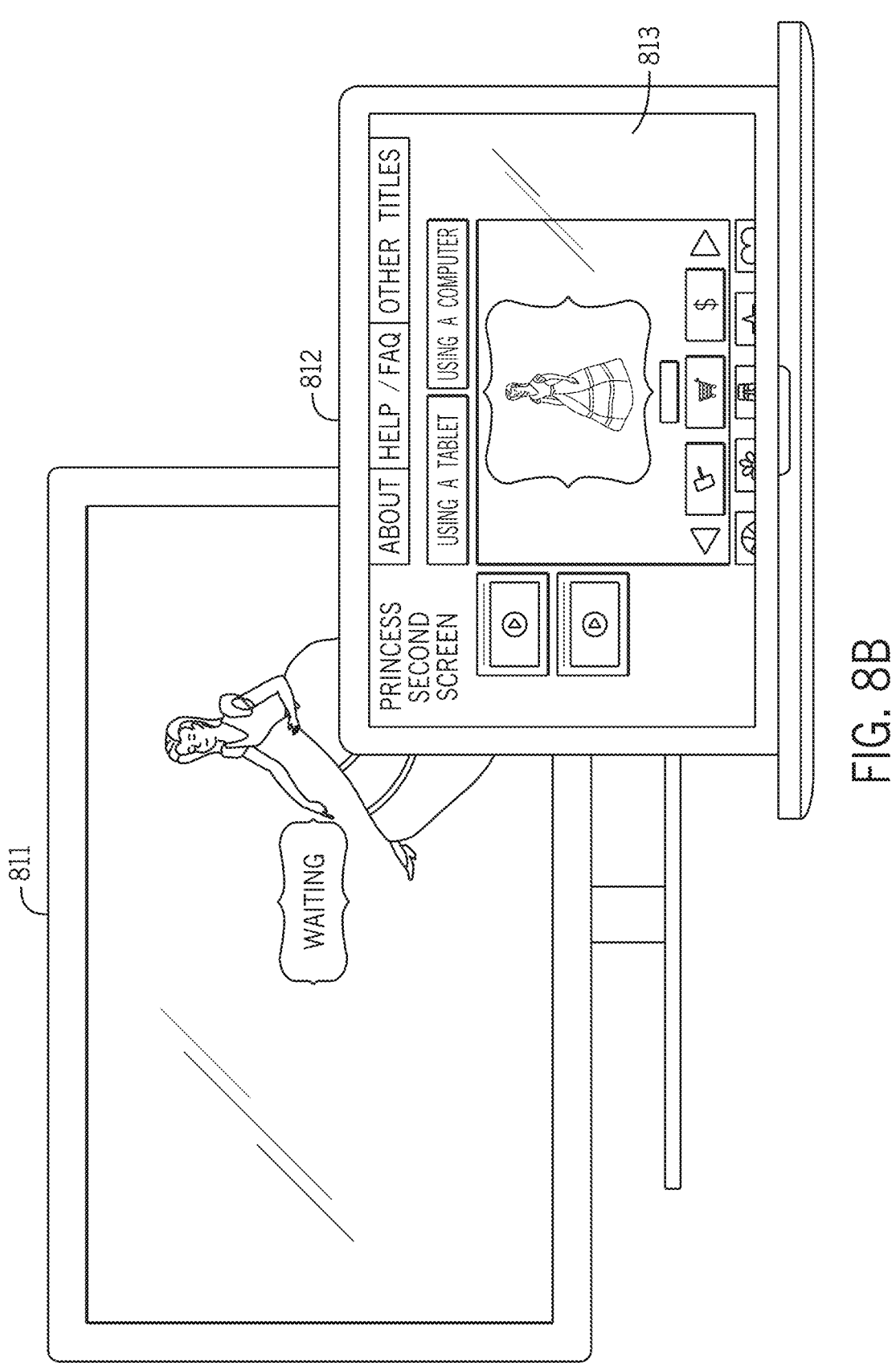
FIG. 8B illustrates an exemplary UI of an exemplary interactive multimedia system in accordance with an embodiment.
Figure 8C:
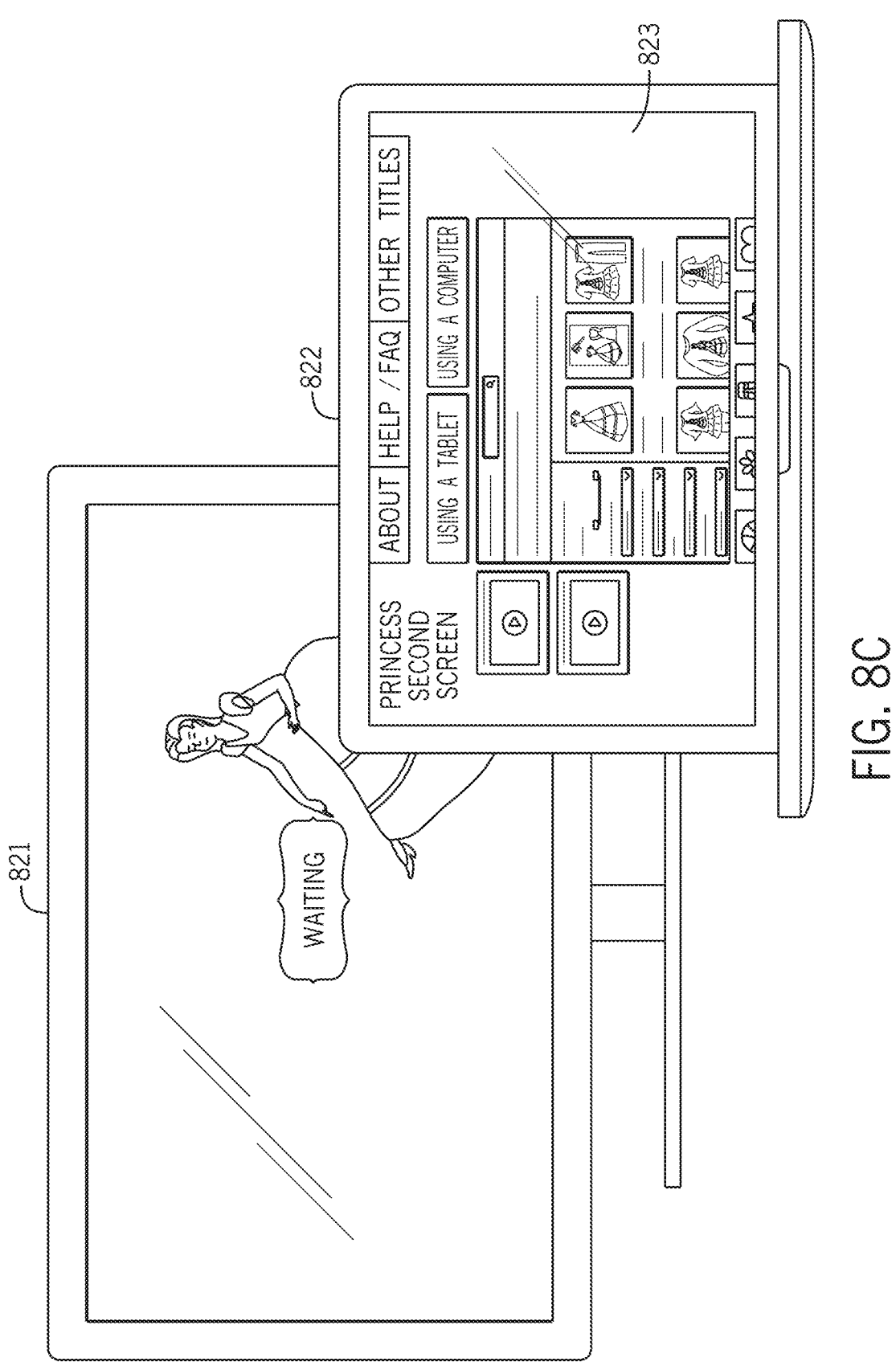
FIG. 8C illustrates an exemplary UI of an exemplary interactive multimedia system in accordance with an embodiment.

FIG. 8A-C illustrate an exemplary this of an interactive multimedia system in accordance with an embodiment. In the illustrated example, the digital media is being displayed on the primary display 801, and the interactive multimedia UI is being displayed on the secondary display 802. Trigger data may be displayed along with the digital media. A user may click on an object (e.g., the gown 803 on the primary display 802) in the digital media to activate trigger data. In response to the user's trigger action, the user may be directed to the UI displayed on the secondary display 802. In the illustrated example, the UI 802 displays a digital storefront hosting a list of items related to the gown 803. The list of items may be determined from a database according to the object (e.g., the gown 803). The list of items may be presented to the user in an order that is determined according to the user's preferences (e.g., item providers, item categories, price ranges, colors, etc.) For example, items that are likely to the purchased are presented first. In the illustrated example, the digital media is paused in the primary display 801 when the user navigates in the secondary display 802. In another embodiment, the digital media may be continuously displayed in the primary display while the user navigates in the secondary display.

In some embodiments, the digital media may be displayed as the background in the secondary display displaying the UI. In some embodiments, a theme related to the digital media may be displayed as the background in the secondary display displaying the UI. For example, as illustrated in FIG. 8B, a Princess theme is being displayed as the background 813 in the secondary screen 812 (e.g., a laptop) when a user is reviewing the item (e.g., a Princess doll) for purchase. As illustrated in FIG. 8C, a Princess theme is being displayed as the background 823 in the secondary screen 822 (e.g., a laptop) when a user is reviewing a list of items in the Fairytale store.

Figure 9:
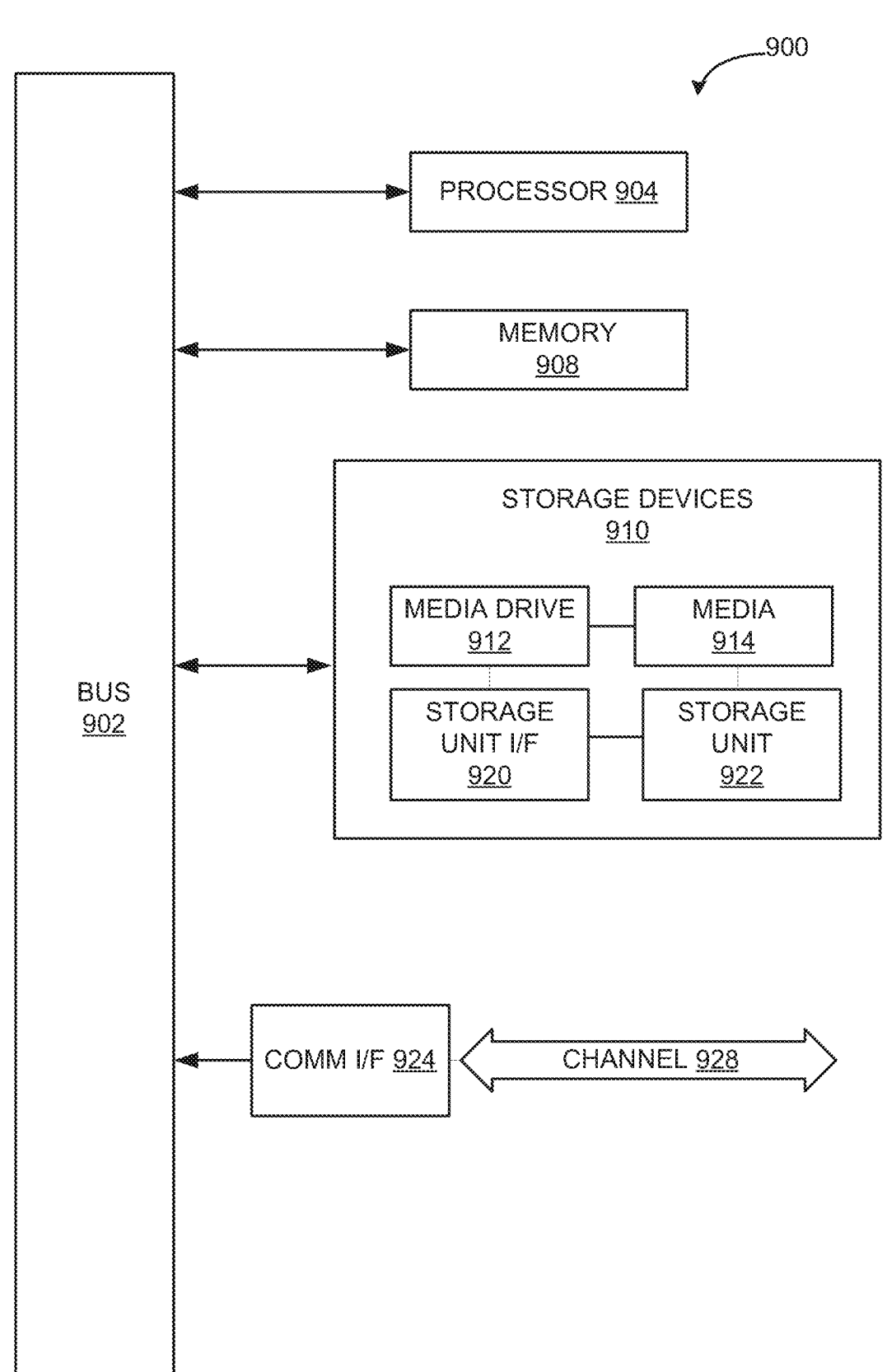
FIG. 9 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PALS, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the application using other computing modules or architectures.

Referring now to FIG. 9, computing module 900 may represent, for example, computing or processing capabilities found within desktop, laptop and notebook computers; hand-held computing devices (PDA's, smart phones, cell phones, palmtops, etc.); mainframes, supercomputers, work-stations or servers; or any other type of special-purpose or general-purpose computing devices as may be desirable or appropriate for a given application or environment, Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a micro-processor, controller, or other control logic. In the illustrated example, processor 904 is connected to a bus 902, although any communication medium can be used to facilitate inter-action with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing module 900.

Computing module 900 might also include a communi-cations interface 924. Communications interface 924 might be used to allow software and data to be transferred between computing module 900 and external devices. Examples of communications interface 924 might include a modem or softmodem, a network interface (such as an Ethernet, net-work interface card, WiMedia, IEEE 802. XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to commu-nications interface 924 via a channel 928. This channel 928 might carry signals and might be implemented using a wired or wireless communication medium. Some examples of a channel might include a phone line, a cellular link, an RE link, an optical link, a network interface, a local or wide area network, and other wired or wireless communications chan-nels.

In this document, the terms "computer program medium" and "computer usable medium" are used to generally refer to transitory or non-transitory media such as, for example, memory 908, storage unit 920, storage media 914, and channel 928. These and other various forms of computer program media or computer usable media may be involved in carrying one or more sequences of one or more instruc-tions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exem-plary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of enabling purchasable item actions associated with digital media, the method comprising:

identifying, by a multimedia platform, an object in the digital media;

subsequent to identifying the object, identifying a plurality of purchasable items related to the object;

presenting, by the multimedia platform, a request to opt in to a digital storefront configured to enable a purchase of at least one purchasable item of the plurality of purchasable items;

receiving, by the multimedia platform, a user input opting in to the digital storefront, and responsive to receiving the user input opting in:

generating, by the multimedia platform, trigger data associated with the object and the plurality of purchasable items;

presenting, by the multimedia platform, the digital media at a first user device;

while presenting the digital media at the first user device, automatically presenting: the trigger data and at least a portion of the digital media being presented at the first media device as a background to the trigger data, at a second user device separate from the first user device;

receiving a command to activate the trigger data from the second user device during the presentation of the digital media at the first user device;

in response to the command to activate the trigger data, causing display of an actionable indication of the at least one purchasable item of the plurality of purchasable items at the second user device, via the digital storefront; and in response to a selection of the actionable indication of the at least one purchasable item, performing an action at the second user device associated with the at least one purchasable item, wherein the action includes adding the at least one purchasable item to a wish list.

2. The computer-implemented method of claim 1, wherein:

the trigger data is associated with a characteristic of the digital media; and the at least one purchasable item corresponds to the characteristic of the digital media.

3. The computer-implemented method of claim 1, wherein:

the digital media is associated with a digital media provider;

the first user device or second user device is associated with a user of a service provided by the digital media provider; and the trigger data is associated with a user profile of the user.

4. The computer-implemented method of claim 1, wherein the trigger data is configured to be compatible only with digital media provided by a first digital media provider and not compatible with digital media provided by other digital media providers.

5. The computer-implemented method of claim 1, further comprising:

identifying the at least one purchasable item based, at least in part, on a user profile of a user of the first user device or the second user device.

6. The computer-implemented method of claim 1, further comprising:

identifying a new purchasable item of the plurality of purchasable items available for purchase; and providing a notification to the second user device that the new purchasable item is available for purchase.

7. The computer-implemented method of claim 1, wherein the digital media is presented for display in a first display area associated with the first user device and the trigger data is displayed in a second display area associated with the second user device.

8. The computer-implemented method of claim 1, wherein the trigger data includes a link to access information associated with the at least one purchasable item.

9. The computer-implemented method of claim 1, wherein the digital storefront includes a theme associated with the digital media.

10. The computer-implemented method of claim 1, further comprising:

presenting, at the first user device or the second user device, an option to enable or disable the trigger data associated with the actionable indication of the at least one purchasable item.

11. The computer-implemented method of claim 1, wherein the selection of the actionable indication includes providing a user interface at the second user device, the user interface including one or more options to add the at least one purchasable item to the shopping cart or wish list or to purchase the at least one purchasable item.

12. The computer-implemented method of claim 1, wherein:

the digital media is a video; and playback of the digital media is paused at the first user device during the selection of the actionable indication at the second user device.

13. The computer-implemented method of claim 1, wherein the digital media is continuously presented at the first user device during the selection of the actionable indication at the second user device.

14. The computer-implemented method of claim 1, wherein the object is non-purchasable and wherein upon a determination that a new purchasable item associated with the object in the wish list is available for purchase, the user is notified that the new purchasable item is available for purchase.

15. A non-transitory computer-readable medium carrying instructions that, when executed by a computing system, cause the computing system to perform operations to enable purchasable item actions associated with digital media, the operations comprising:

identifying, by a multimedia platform, an object in the digital media;

subsequent to identifying the object, identifying a plurality of purchasable items related to the object;

presenting, by the multimedia platform, a request to opt in to a digital storefront configured to enable a purchase of at least one purchasable item of the plurality of purchasable items;

receiving, by the multimedia platform, a user input opting in to the digital storefront, and responsive to receiving the user input opting in:

generating, by the multimedia platform, trigger data associated with the object and the plurality of purchasable items;

presenting, by the multimedia platform, the digital media at a first user device;

while presenting the digital media at the first user device, automatically presenting the trigger data and at least a portion of the digital media being presented at the first media device as a background to the trigger data, at a second user device separate from the first user device;

receiving a command to activate the trigger data from the second user device during the presentation of the digital media at the first user device;

in response to the command to activate the trigger data, causing display of an actionable indication of the at least one purchasable item of the plurality of purchasable at the second user device, via the digital storefront; and in response to a selection of the actionable indication of the at least one purchasable item, performing an action at the second user device associated with the at least one purchasable item, wherein the action includes adding the at least one purchasable item to a wish.

16. The non-transitory computer-readable medium of claim 15, wherein the digital media is associated with a provider of a streaming service and the digital media comprises at least one frame of a digital video.

17. The non-transitory computer-readable medium of claim 15, wherein the trigger data or the at least one purchasable item is associated with a characteristic of the digital media.

18. The non-transitory computer-readable medium of claim 15, wherein:

the digital media is associated with a digital media provider;

the first user device or the second user device is associated with a user of a service provided by the digital media provider;

the trigger data is associated with a user profile of the user; and the trigger data is configured to be compatible only with digital media content provided by the digital media provider and not compatible with digital media content provided by other digital media providers.

19. The non-transitory computer-readable medium of claim 15, wherein the trigger data includes a link to access information associated with the at least one purchasable item.

20. A computer-implemented method of enabling purchasable item actions associated with digital media, the method comprising:

identifying, by a multimedia platform, an object in the digital media;

subsequent to identifying the object, identifying a plurality of purchasable items related to the object;

presenting, by the multimedia platform, a request to opt in to a digital storefront configured to enable a purchase of at least one purchasable item of the plurality of purchasable items;

receiving, by the multimedia platform, a user input opting in to the digital storefront, and responsive to receiving the user input opting in:

generating, by the multimedia platform, trigger data associated with the object and the plurality of purchasable items;

presenting, by the multimedia platform, the digital media at a first user device;

while presenting the digital media at the first user device, automatically presenting the trigger data and at least a portion of the digital media being presented at the first media device as a background to the trigger data, at a second user device separate from the first user device;

receiving a command to activate the trigger data from the second user device during the presentation of the digital media at the first user device;

in response to the command to activate the trigger data, causing display of the at least one purchasable item of the plurality of purchasable items at the second user device, via the digital storefront; and in response to a selection of the actionable indication of the at least one purchasable item, adding the at least one purchasable item to a wish list.

* * * * *